United States Patent
Hagimoto et al.

(10) Patent No.: US 10,125,654 B2
(45) Date of Patent: Nov. 13, 2018

(54) EXHAUST CONTROL SYSTEM FOR INTERNAL COMBUSTION ENGINE

(71) Applicant: TOYOTA JIDOSHA KABUSHIKI KAISHA, Toyota-shi, Aichi (JP)

(72) Inventors: Taiga Hagimoto, Susono (JP); Tomoyuki Kogo, Gotenba (JP); Arifumi Matsumoto, Gotenba (JP); Kenji Furui, Susono (JP); Akifumi Uozumi, Susono (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 332 days.

(21) Appl. No.: 15/103,106

(22) PCT Filed: Dec. 19, 2014

(86) PCT No.: PCT/JP2014/083760
§ 371 (c)(1),
(2) Date: Jun. 9, 2016

(87) PCT Pub. No.: WO2015/093603
PCT Pub. Date: Jun. 25, 2015

(65) Prior Publication Data
US 2016/0376972 A1 Dec. 29, 2016

(30) Foreign Application Priority Data
Dec. 19, 2013 (JP) .................. 2013-263030

(51) Int. Cl.
*F01N 11/00* (2006.01)
*F01N 3/035* (2006.01)
(Continued)

(52) U.S. Cl.
CPC .......... *F01N 11/00* (2013.01); *B01D 53/9418* (2013.01); *B01D 53/9477* (2013.01);
(Continued)

(58) Field of Classification Search
CPC ........... F01N 2560/05; F01N 2560/026; F01N 2250/02; F01N 11/00; F01N 3/035; F01N 2900/1606; F01N 3/2066
See application file for complete search history.

(56) References Cited

U.S. PATENT DOCUMENTS 9,879,586 B2 * 1/2018 Hagimoto ............... F01N 3/035
2008/0229730 A1 9/2008 Ishibashi
(Continued)

FOREIGN PATENT DOCUMENTS

| DE | 10 2009 000 286 A1 | 7/2010 |
|---|---|---|
| JP | 2008-231978 | 10/2008 |
| JP | 2013-181465 | 9/2013 |

*Primary Examiner* — Mark Laurenzi
*Assistant Examiner* — Jason Sheppard
(74) *Attorney, Agent, or Firm* — Finnegan, Henderson, Farabow, Garrett & Dunner, LLP

(57) ABSTRACT

An exhaust control system for an internal combustion engine comprises: a trapping capability acquisition part that obtains information regarding a PM trapping capability, based on a detection value of an exhaust sensor provided to detect a predetermined parameter relating to an exhaust gas flowing out of an SCRF; and a NOx reduction capability acquisition part obtains information regarding a NOx reduction capability, based on an amount of NOx in the exhaust gas flowing out of the SCRF. The exhaust control system determines and distinguishes between a trapping abnormal state in which a PM trapping function by the SCRF is failed and a sensor abnormal state in which a detection function of the predetermined parameter by the exhaust sensor is failed, based on the NOx reduction capability obtained by the NOx reduction capability acquisition part, when the trapping capability obtained by the trapping capability acquisition part is in a predetermined low trapping capability state. This allows for (Continued)

accurate abnormality determination with regard to the SCRF in the exhaust control system for the internal combustion engine having the SCRF.

10 Claims, 7 Drawing Sheets

(51) Int. Cl.
    *F01N 3/10*     (2006.01)
    *F01N 3/20*     (2006.01)
    *B01D 53/94*     (2006.01)
    *F01N 9/00*     (2006.01)
    *F01N 3/36*     (2006.01)

(52) U.S. Cl.
    CPC ......... *B01D 53/9495* (2013.01); *F01N 3/035* (2013.01); *F01N 3/103* (2013.01); *F01N 3/106* (2013.01); *F01N 3/2066* (2013.01); *F01N 9/002* (2013.01); *B01D 2251/2062* (2013.01); *B01D 2251/2067* (2013.01); *F01N 3/36* (2013.01); *F01N 2250/02* (2013.01); *F01N 2550/02* (2013.01); *F01N 2550/04* (2013.01); *F01N 2560/026* (2013.01); *F01N 2560/05* (2013.01); *F01N 2560/14* (2013.01); *F01N 2570/18* (2013.01); *F01N 2610/02* (2013.01); *F01N 2900/0412* (2013.01); *F01N 2900/1402* (2013.01); *F01N 2900/1606* (2013.01); *F01N 2900/1621* (2013.01); *Y02T 10/24* (2013.01); *Y02T 10/47* (2013.01)

(56) References Cited

U.S. PATENT DOCUMENTS

2010/0180669 A1     7/2010   Baars et al.
2015/0047328 A1*   2/2015   Larose, Jr. .............. F01N 3/035
                                                        60/297

* cited by examiner

[FIG. 1]
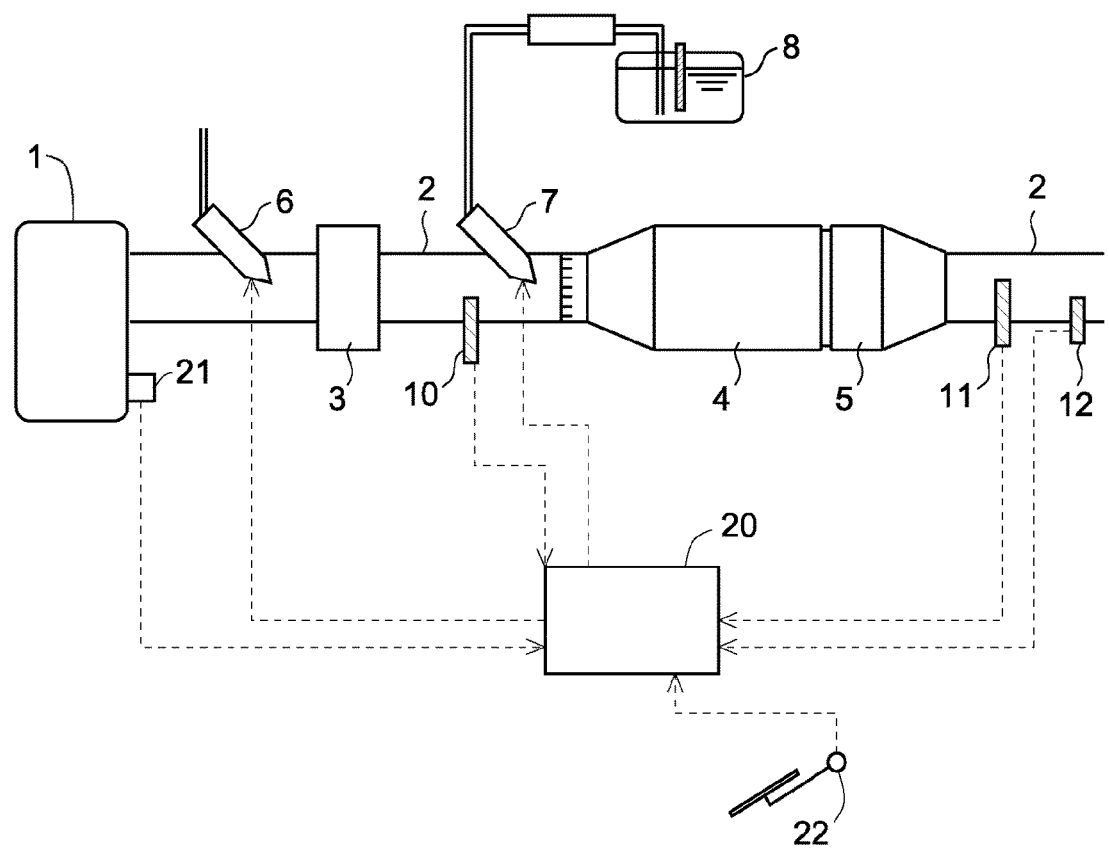

[FIG. 2]
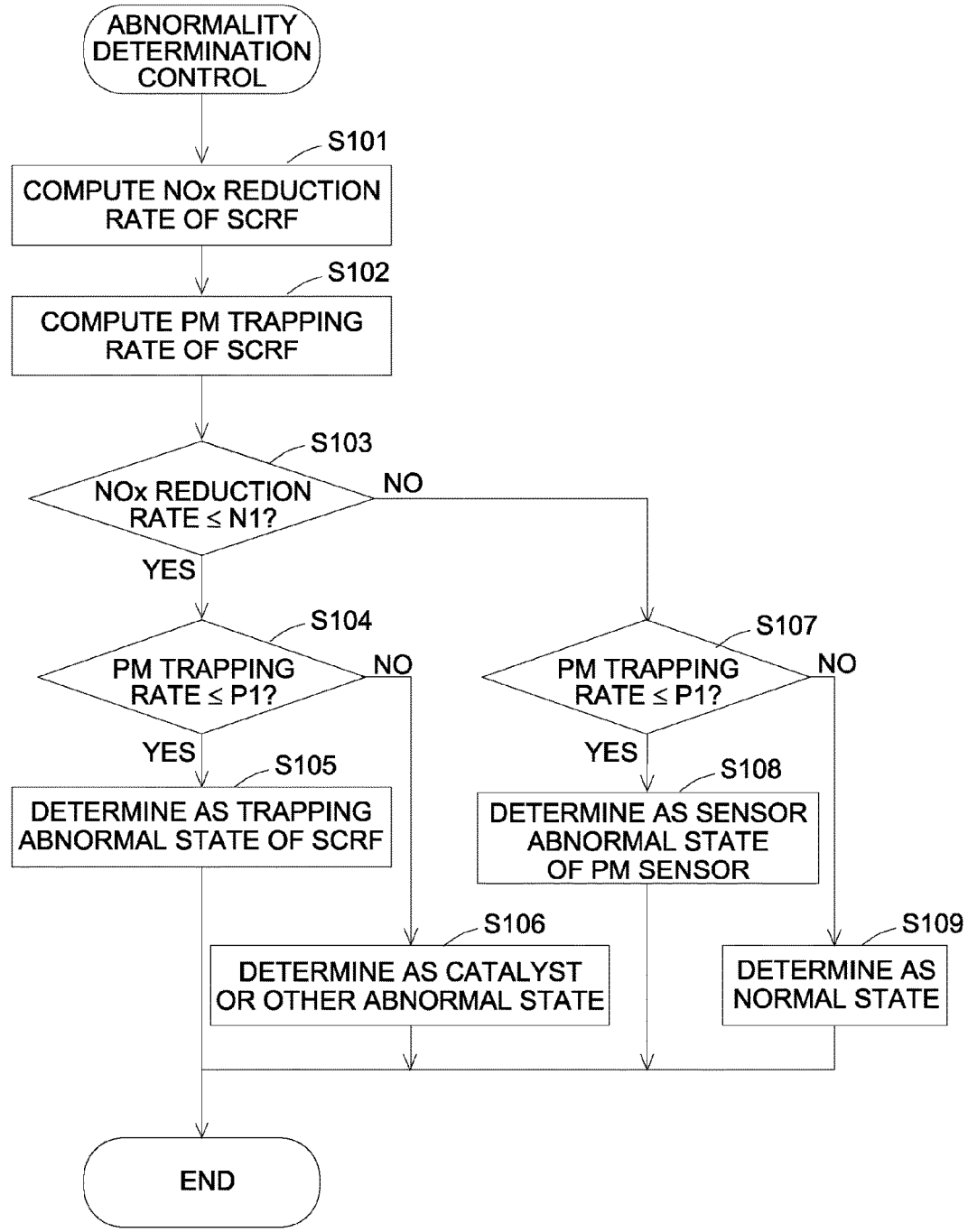

[FIG. 3]
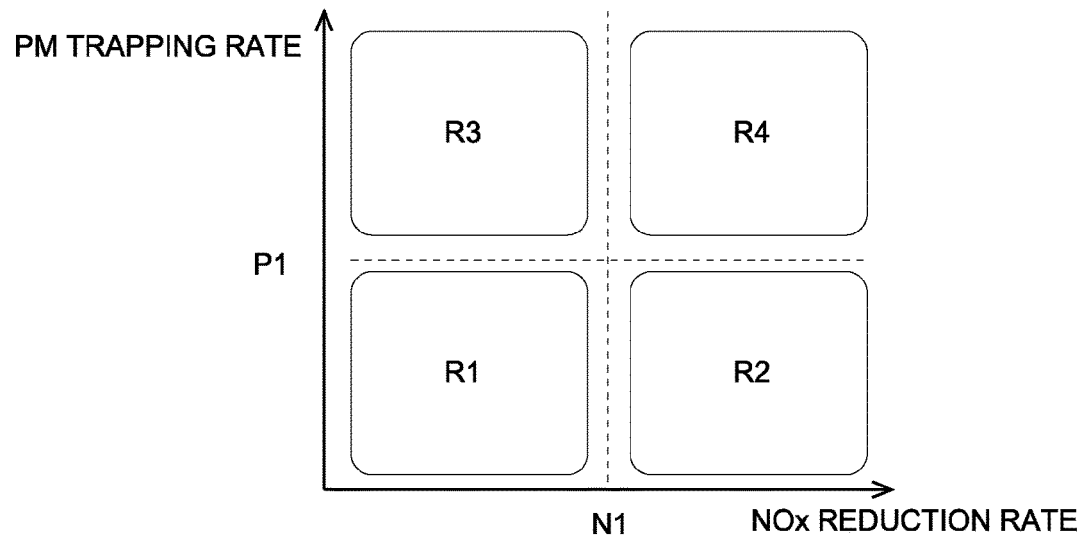
[FIG. 4]
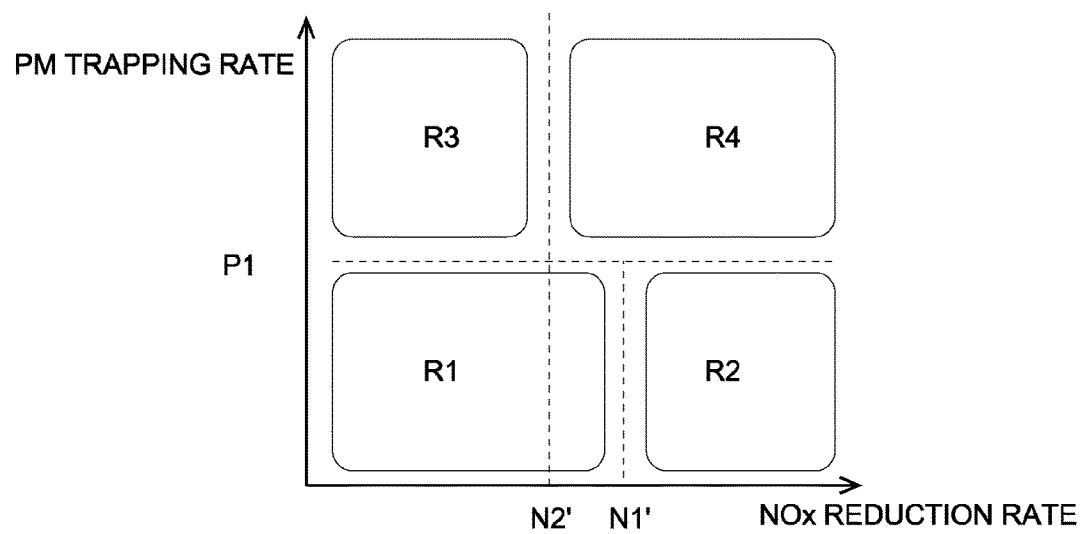

[FIG. 5]
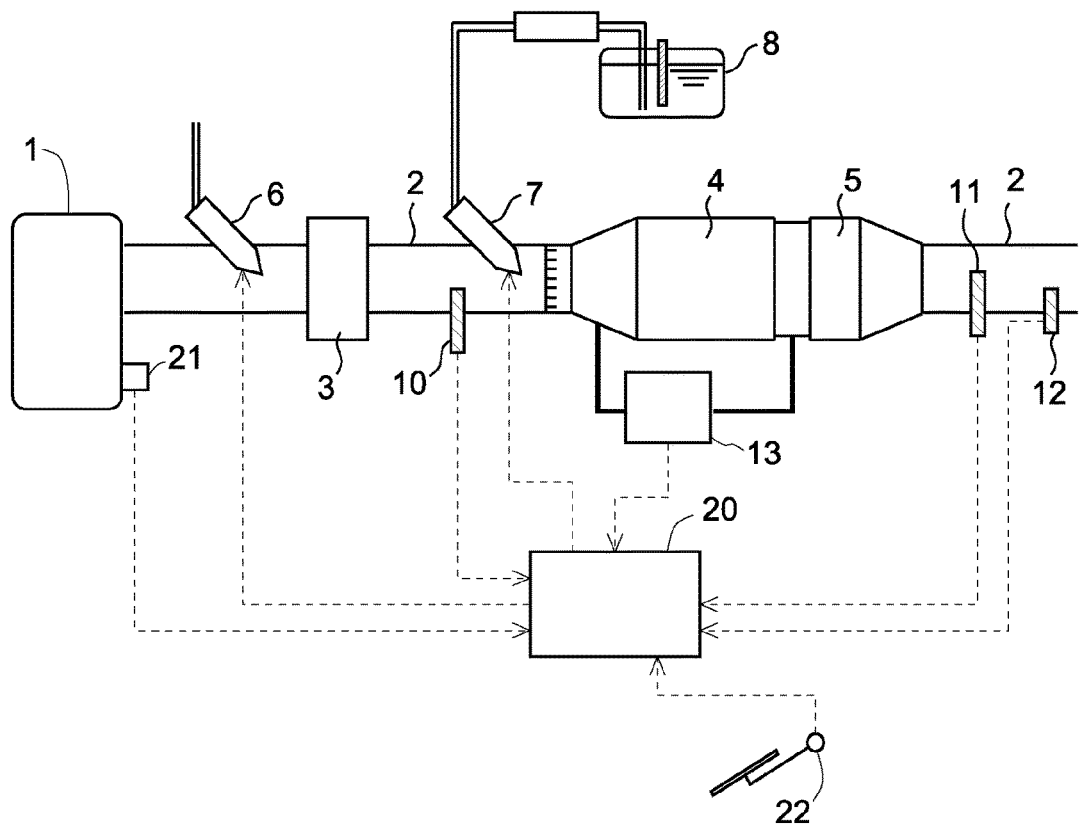

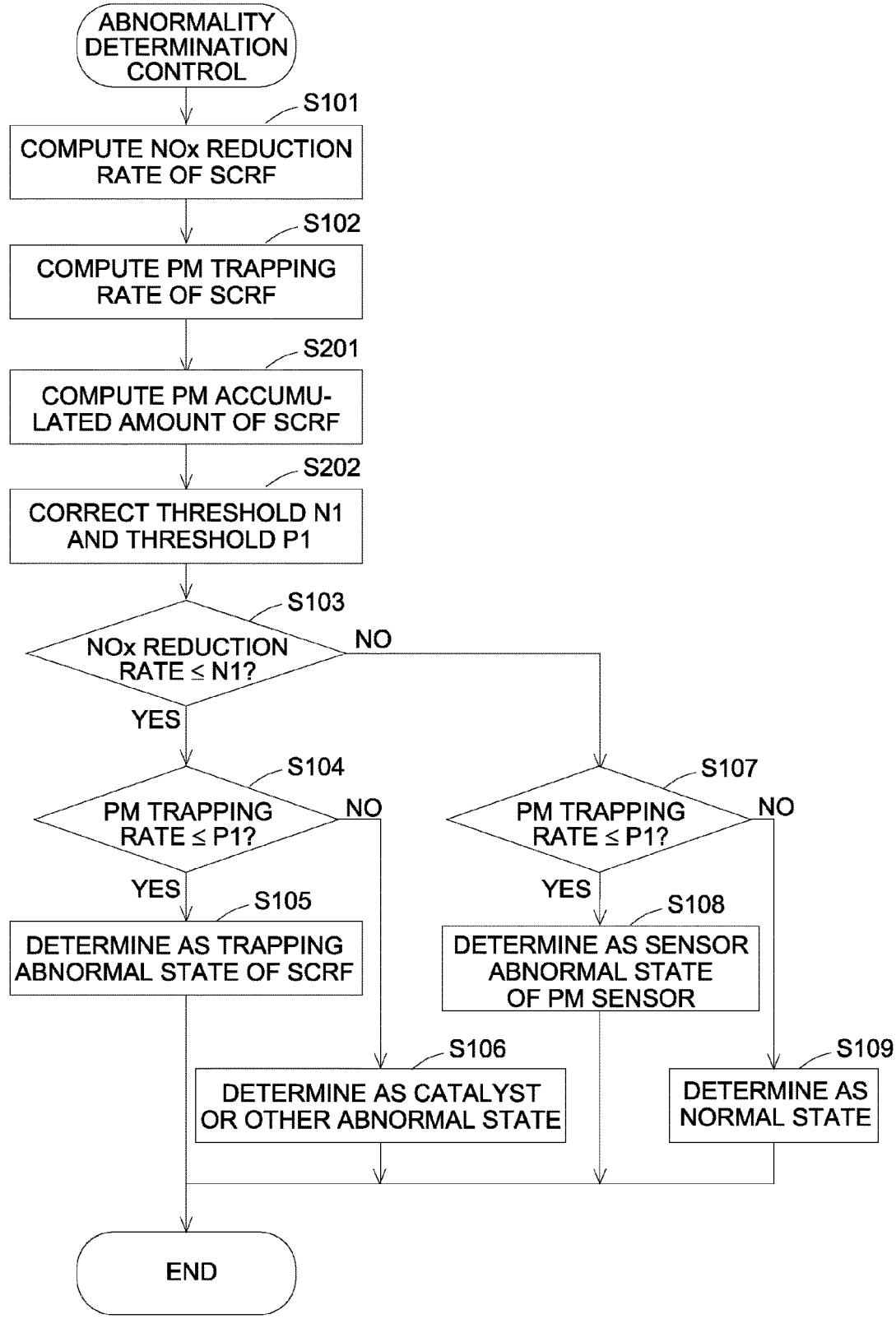

[FIG. 7]
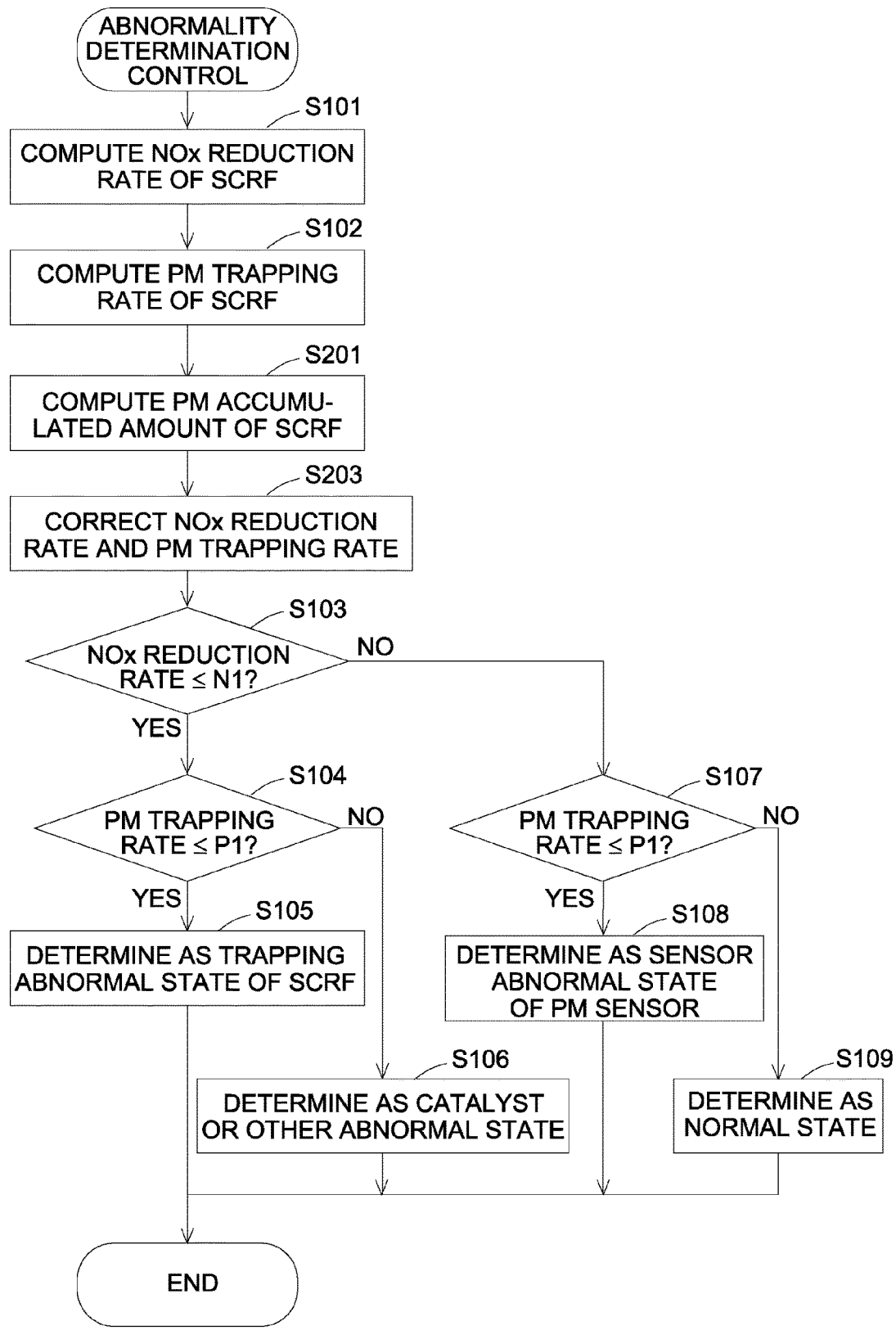

[FIG. 8]
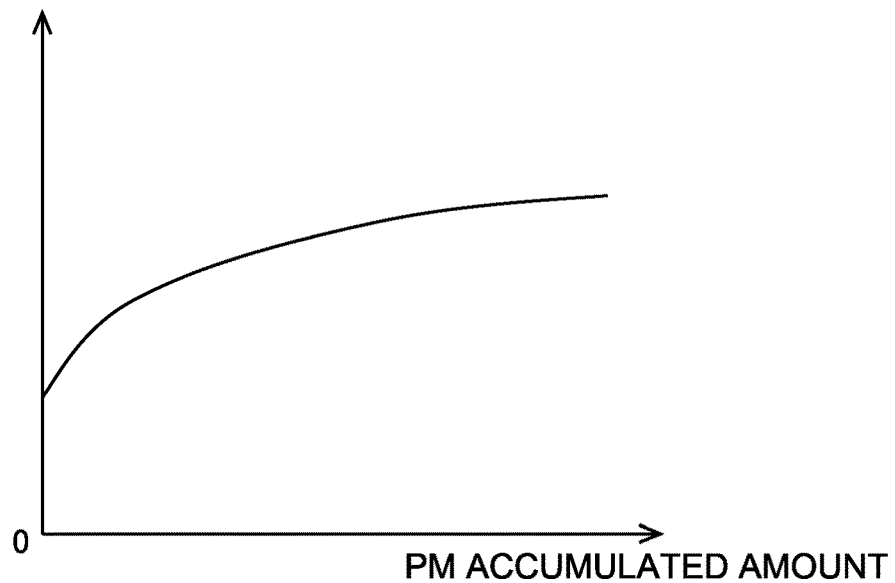
[FIG. 9]
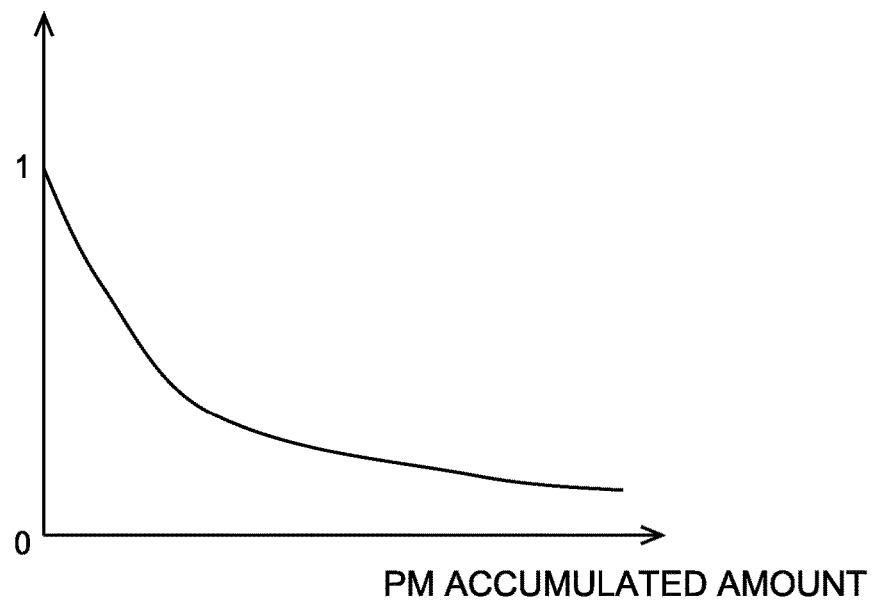

EXHAUST CONTROL SYSTEM FOR INTERNAL COMBUSTION ENGINE

CROSS-REFERENCE TO RELATED APPLICATIONS

This application is a national phase application of International Application No. PCT/JP2014/083760, filed Dec. 19, 2014, and claims the priority of Japanese Application No. 2013-263030, filed Dec. 19, 2013, the content of both of which is incorporated herein by reference.

TECHNICAL FIELD

The present invention relates to an exhaust control system for an internal combustion engine.

BACKGROUND ART

A developed exhaust control apparatus provided in an exhaust passage of an internal combustion engine has a selective catalytic reduction NOx catalyst (hereinafter may be referred to as "SCR catalyst") of selectively reducing NOx in the exhaust gas that is supported in a filter. The filter traps particulate matter (hereinafter referred to as "PM") in the exhaust gas. The SCR catalyst reduces NOx in the exhaust gas using ammonia ($NH_3$) as a reducing agent. In the description below, the filter having this SCR catalyst supported therein is called "SCRF". In an exhaust control system for an internal combustion engine having an SCRF, an oxidation catalyst and a urea supply valve for NOx reduction are placed on the upstream side of the SCRF. Employing the SCRF in the exhaust control system allows the SCR catalyst to be placed on the more upstream side in the exhaust passage. The SCR catalyst is thus more likely to be heated by the heat of the exhaust gas. This enhances the warm-up of the SCR catalyst and improves the NOx reduction rate of the SCR catalyst.

An exhaust control system described in Patent Literature 1 has an SCRF and uses a PM sensor placed on the downstream side of the filter to determine a damage of the filter. In the case where the filter is damaged, the flow of the exhaust gas is concentrated into the damage location. This significantly increases the detection value of this PM sensor. A damage of the SCRF is determined by using such an increase in the detection value.

CITATION LIST

Patent Literature

Patent Literature 1: German Published Patent Application 102009000286
Patent Literature 2: Japanese Patent Application Laid-Open No. 2013-181465A
Patent Literature 3: Japanese Patent Application Laid-Open No. 2008-231978A
Patent Literature 4: Japanese Patent Application Laid-Open No. 2007-107465A

SUMMARY OF INVENTION

Technical Problem

Like the prior art described above, in the exhaust control system for the internal combustion engine having the SCRF, the PM sensor may be placed on the downstream side of the SCRF, and abnormality determination of the SCRF may be performed using the detection value of the PM sensor. In the case where the PM sensor is in an abnormal state that does not sufficiently exert the real function of detecting the particulate matter, however, the detection value of the PM sensor is likely to be higher than the value in the normal state. In this case, abnormality determination of the SCRF based on the detection value of the PM sensor like the above prior art is likely to erroneously determine that the SCRF is abnormal, since the detection value of the PM sensor is abnormally high even when the SCRF is normal.

By taking into account the problems described above, an object of the invention is to accurately determine an abnormality with regard to an SCRF in an exhaust control system for an internal combustion engine having the SCRF.

Solution to Problem

In order to solve the above problems, the applicant of the invention has noted that the SCRF has the function of selective catalytic reduction of NOx in the exhaust gas, as well as the function of trapping the particulate matter. Accordingly, the SCRF has a configuration of simultaneously exerting these two functions for exhaust control. It is accordingly desirable to sufficiently take into account these functions characteristic of the SCRF in detection of an abnormality with regard to the SCRF.

More specifically, according to an aspect of the invention, there is provided an exhaust control system for an internal combustion engine, comprising: a NOx reduction filter that is provided in an exhaust passage of the internal combustion engine to trap a particulate matter included in an exhaust gas and is configured by supporting a selective catalytic reduction NOx catalyst that selectively reduces NOx in the exhaust gas using ammonia as a reducing agent; a reducing agent supply part that supplies ammonia or a precursor of ammonia to the NOx reduction filter via the exhaust gas flowing into the NOx reduction filter; a trapping capability acquisition part that obtains information regarding a trapping capability of the NOx reduction filter to trap the particulate matter in the exhaust gas, based on a detection value of an exhaust sensor provided to detect a predetermined parameter relating to the exhaust gas flowing out of the NOx reduction filter; a NOx reduction capability acquisition part that obtains information regarding a NOx reduction capability of the NOx reduction filter, based on an amount of NOx in the exhaust gas flowing out of the NOx reduction filter; and a determination part that determines and distinguishes between a trapping abnormal state in which a trapping function of the particulate matter by the NOx reduction filter is failed and a sensor abnormal state in which a detection function of the predetermined parameter by the exhaust sensor is failed, based on the NOx reduction capability, when the trapping capability is in a predetermined low trapping capability state.

The exhaust control system of the invention has the NOx reduction filter (hereinafter simply referred to as "filter") that is equivalent to what is called an SCRF to simultaneously allow for NOx reduction in the exhaust gas by the selective catalytic reduction NOx catalyst and trapping of the particulate matter in the exhaust gas by the filter. With regard to the former, ammonia as the reducing agent or its precursor (hereinafter referred to as "ammonia or the like") is supplied to the exhaust gas by the reducing agent supply part and is eventually adsorbed to the selective catalytic reduction NOx catalyst supported in the filter, so as to cause a selective catalytic reduction reaction with NOx. With regard to the latter, on the other hand, the particulate matter in the exhaust gas is trapped by the filter, and this suppresses release of the particulate matter to the outside.

In the exhaust control system of the above aspect, the determination part performs abnormality determination with regard to the filter and the exhaust sensor. The exhaust sensor is a sensor provided to detect the predetermined parameter relating to the exhaust gas flowing out of the filter, for example, the amount of the particulate matter in the exhaust gas or the pressure of the exhaust gas. The trapping capability acquisition part obtains the information regarding the trapping capability of the filter to trap the particulate matter by using the detection value of this exhaust sensor. One example of such information is a trapping rate as a parameter indicating to what extent the particulate matter included in the exhaust gas flowing into the filter is trapped by the filter. The amount of the particulate matter included in the exhaust gas flowing into the filter may be obtained according to the operating conditions of the internal combustion engine or may be obtained by another sensor, so that the trapping capability acquisition part can obtain the trapping rate as the trapping capability, along with the detection value of the exhaust sensor. When a differential pressure sensor configured to detect a difference between the exhaust pressure on the upstream side of the filter and the exhaust pressure on the downstream side of the filter is used as the exhaust sensor, a change in amount of the particulate matter trapped by the filter is recognizable from a change in detection value of the differential pressure sensor. This enables the trapping capability acquisition part to obtain the trapping rate as the trapping capability. As understood from the above description, any sensor other than the PM sensor and the differential pressure sensor described above may be employed for the exhaust sensor, as long as the sensor detects a parameter reflecting the trapping capability of the filter to trap the particulate matter, from the exhaust gas flowing out of the filter.

Additionally, the exhaust control system of the above aspect includes the NOx reduction capability acquisition part that obtains the information regarding the NOx reduction capability as a parameter indicating to what extent NOx in the exhaust gas flowing into the filter is reduced by the selective catalytic reduction NOx catalyst supported in the filter. One example of such information is a NOx reduction rate by the filter. Like the trapping capability acquisition part, the NOx reduction capability acquisition part obtains the NOx reduction rate as the NOx reduction capability by using at least the amount of NOx in the exhaust gas flowing out of the filter. For example, the NOx reduction rate as the NOx reduction capability can be obtained by using the detection value of a NOx sensor provided on the downstream side of the filter and additionally using the amount of NOx in the exhaust gas flowing into the filter, which is estimated according to the operating conditions of the internal combustion engine or is detected by another sensor.

Since the filter is the SCRF, in the trapping abnormal state that the trapping function of the particulate matter by the filter is failed, the exhaust gas without sufficiently removing the particulate matter flows out to the downstream side of the filter and is also not sufficiently treated by the exhaust control function of the selective catalytic reduction NOx catalyst supported in the filter. Accordingly, in the trapping abnormal state of the filter, both the trapping capability obtained by the trapping capability acquisition part described above and the NOx reduction capability obtained by the NOx reduction capability acquisition part described above deteriorate to be lower than those in the normal state.

In the sensor abnormal state that the detection function of the exhaust sensor is failed and that is not sufficiently detectable by the prior art, on the other hand, the filter itself is normal. The trapping capability obtained by the trapping capability acquisition part described above is affected by the abnormal detection value of the exhaust sensor, whereas at least the NOx reduction capability is not affected.

By sufficiently taking into account the functions of the filter that is the SCRF, the determination part can determine and distinguish between the trapping abnormal state of the filter and the sensor abnormal state of the exhaust sensor based on the NOx reduction capability, when the trapping capability is in the predetermined low trapping capability state. The exhaust control system according to the above aspect of the invention can thus appropriately detect the abnormal state of the filter.

As described above, an example of the information regarding the trapping capability of the filter is the trapping rate, and an example of the information regarding the NOx reduction capability of the filter is the NOx reduction rate. Accordingly, the trapping capability acquisition part may obtain the trapping rate of the particulate matter in the exhaust gas by the NOx reduction filter as the information regarding the trapping capability, based on the detection value of the exhaust sensor. The NOx reduction capability acquisition part may obtain the NOx reduction rate by the NOx reduction filter as the information regarding the NOx reduction capability, based on the amount of NOx in the exhaust gas flowing out of the NOx reduction filter. In this case, the determination part may determine and distinguish between the trapping abnormal state and the sensor abnormal state, based on the NOx reduction rate, when the trapping rate is in the predetermined low trapping rate area that corresponds to the predetermined low trapping capability state. The predetermined low trapping rate area denotes a range of the trapping rate that specifies the failed state of the trapping function of the NOx reduction filter from the standpoint of the trapping rate of the particulate matter.

In the exhaust control system for the internal combustion engine according to the above aspect, with regard to determination by the determination part, at least a predetermined low reduction rate area and a predetermined high reduction rate area having a relatively higher NOx reduction rate than the predetermined low reduction rate area may be set as areas relating to the NOx reduction rate. The determination part may determine that the NOx reduction filter is in the trapping abnormal state when the trapping rate is in the predetermined low trapping rate area and the NOx reduction rate is in the predetermined low reduction rate area. The determination part may determine that the exhaust sensor is in the sensor abnormal state when the trapping rate is in the predetermined low trapping rate area and the NOx reduction rate is in the predetermined high reduction rate area.

At least the low reduction rate area and the high reduction rate area are set as the areas relating to the NOx reduction rate obtained by the NOx reduction rate acquisition part. These two areas are related to the trapping abnormal state of the filter and the sensor abnormal state of the exhaust sensor as described above. In the trapping abnormal state of the filter that is the SCRF, the trapping rate of the filter decreases to be lower than that in the normal state (in other words, the amount of the particulate matter in the exhaust gas on the downstream side of the filter increases to be higher than that in the normal state, due to insufficient trapping of the particulate matter), while the NOx reduction rate decreases (in other words, the amount of NOx increases to be greater than that in the normal state, due to insufficient NOx reduction). Based on these facts, the low reduction rate area is provided as the area related to the trapping abnormal state of the filter. In the sensor abnormal state that the SCRF is normal but the exhaust sensor is abnormal, on the other hand, the trapping rate of the filter decreases to be lower than that in the normal state (in other words, the abnormal sensor output value is reflected to the trapping rate, although trapping of the particulate matter by the filter is performed appropriately), while the NOx reduction rate maintains the normal value (in other words, since the filter has no abnormality, the appropriate NOx reduction rate is obtained without being affected by the exhaust sensor). Based on these facts, the high reduction rate area is provided as the area related to the sensor abnormal state of the exhaust sensor. As described above, the areas relating to the NOx reduction rate are set in relation to the functions of the SCRF. This can appropriately determine and distinguish between the trapping abnormal state of the filter and the sensor abnormal state of the sensor.

The exhaust control system for the internal combustion engine according to the above aspect may further comprise a trapping rate correction part that corrects the trapping rate, based on an amount of the particulate matter trapped by the NOx reduction filter. The determination part may perform the determination based on the NOx reduction rate obtained by the NOx reduction rate acquisition part, when the trapping rate corrected by the trapping rate correction part is in the predetermined low trapping rate area. It is preferable to obtain the above trapping rate that is used to check the trapping function of the filter, based on the standpoint of whether the trapping function of the filter actually works or not. In general, in the case where only a small amount of the particulate matter is accumulated on the filter, the pores in the filter efficiently trap the particulate matter. This allows the particulate matter to be actually trapped by the filter. Increasing the accumulated amount of the particulate matter on the filter, however, clogs the pores and makes the particulate matter more likely to be accumulated on the surface layer of the filter. The ratio of accumulation on the surface layer tends to increase with an increase in accumulated amount of the particulate matter. Such accumulation of the particulate matter on the surface layer is far from real trapping by the filter. According to this aspect, the determination part performs the determination using the trapping rate corrected by the trapping rate correction part by taking into account the actual trapping state of the particulate matter by the filter. This can accurately determine the trapping function of the filter and can thus accurately perform abnormality determination with regard to the filter and the sensor described above.

Additionally, the exhaust control system for the internal combustion engine according to the above aspect may further comprise a NOx reduction rate correction part that corrects the NOx reduction rate, based on an amount of the particulate matter trapped by the NOx reduction filter. The determination part may perform the determination based on the NOx reduction rate corrected by the NOx reduction rate correction part, when the trapping rate is in the predetermined low trapping rate area. In order to distinguish between the trapping abnormal state of the filter and the sensor abnormal state of the exhaust sensor, it is preferable that the NOx reduction rate reflects the actual degree of the NOx reduction capability by the selective catalytic reduction NOx catalyst supported in the filter. Increasing the accumulated amount of the particulate matter on the filter causes the surface of the selective catalytic reduction NOx catalyst to be covered by the particulate matter and decreases the amount of $NO_2$ in the vicinity of the selective catalytic reduction NOx catalyst. This provides an apparent decrease from the practical NOx reduction capability of the SCRF. In this state, although the NOx reduction function is actually normal, the NOx reduction rate is estimated to be excessively low. This may adversely affect the determination by the determination part. As described above, according to this aspect, the determination part performs the determination using the NOx reduction rate corrected by the NOx reduction rate correction part by taking into account the practical trapping condition of the particulate matter by the filter. This can accurately determine the NOx reduction capability of the filter and can thus accurately perform abnormality determination with regard to the filter and the sensor described above.

In the above aspect of the invention, correcting the trapping rate and the NOx reduction rate aims to eliminate or reduce the difference between the actual trapping capability and the trapping rate and the difference between the actual NOx reduction capability and the NOx reduction rate and thereby improves the accuracy of the determination by the determination part. Instead of the above aspect, correcting a threshold that defines the predetermined low trapping rate area or that defines the predetermined low reduction rate area based on the amount of the particulate matter can also improve the accuracy of the determination by the determination part. More specifically, the exhaust control system for the internal combustion engine according to the above aspect may further comprise a trapping rate threshold correction part that corrects an upper limit threshold of the trapping rate which defines the predetermined low trapping rate area, based on an amount of the particulate matter trapped by the NOx reduction filter. The determination part may perform the determination based on the NOx reduction rate obtained by the NOx reduction rate acquisition part, when the trapping rate is in a corrected low trapping rate area defined by the upper limit threshold corrected by the trapping rate threshold correction part.

The exhaust control system for the internal combustion engine according to the above aspect may further comprise a reduction rate threshold correction part that corrects a threshold of the NOx reduction rate which defines the predetermined low reduction rate area and the predetermined high reduction rate area, based on an amount of the particulate matter trapped by the NOx reduction filter. The determination part may determine that the exhaust sensor is in the sensor abnormal state, when the trapping rate is in the predetermined low trapping rate area and the NOx reduction rate is in a corrected high reduction rate area defined by the threshold of the NOx reduction rate corrected by the reduction rate threshold correction part.

In the exhaust control system for the internal combustion engine according to the above aspect, the trapping abnormal state may include at least one of a damage state caused by cracking of the NOx reduction filter, an erosion state of the NOx reduction filter and a state where the NOx reduction filter is not installed.

The exhaust control system for the internal combustion engine according to the above aspect may further comprise a notification part that notifies a user of a result of the determination by the determination part. This can certainly notify the user of the result of the determination and encourage the user to, for example, replace or repair the filter or the exhaust sensor.

Advantageous Effects of Invention

The invention allows for accurate abnormality determination with regard to the SCRF in the exhaust control system for the internal combustion engine having the SCRF.

BRIEF DESCRIPTION OF DRAWINGS

FIG. 1 is a diagram illustrating the schematic configuration of an exhaust control system for an internal combustion engine according to the invention;

FIG. 2 is a first control flowchart of abnormality determination with regard to an SCRF performed in the exhaust control system for the internal combustion engine according to the invention;

FIG. 3 is a first diagram illustrating control areas defined by a NOx reduction rate and a PM trapping rate of the SCRF in the abnormality determination control shown in FIG. 2;

FIG. 4 is a second diagram illustrating control areas defined by the NOx reduction rate and the PM trapping rate of the SCRF in the abnormality determination control shown in FIG. 2;

FIG. 5 is a diagram illustrating the schematic configuration of another exhaust control system for an internal combustion engine according to the invention;

FIG. 6 is a second control flowchart of abnormality determination with regard to the SCRF performed in the exhaust control system for the internal combustion engine according to the invention;

FIG. 7 is a third control flowchart of abnormality determination with regard to the SCRF performed in the exhaust control system for the internal combustion engine according to the invention;

FIG. 8 is a diagram illustrating a correlation between PM accumulated amount and a correction factor involved in correction of the NOx reduction rate performed in the abnormality determination control shown in FIG. 7; and FIG. 9 is a diagram illustrating a correlation between PM accumulated amount and a correction factor involved in correction of the PM trapping rate performed in the abnormality determination control shown in FIG. 7.

DESCRIPTION OF EMBODIMENTS

The following describes concrete embodiments of the invention with reference to the drawings. The dimensions, the materials, the shapes, the positional relationships and the like of the respective components described in the following embodiments are only for the purpose of illustration and are not intended at all to limit the scope of the invention to such specific descriptions.

Embodiment 1

An embodiment of the exhaust control system for the internal combustion engine according to the invention is described with reference to drawings attached to the description hereof. FIG. 1 is a diagram illustrating the schematic configuration of an exhaust control system for an internal combustion engine according to an embodiment. The internal combustion engine 1 is a diesel engine for driving a vehicle. The internal combustion engine of the invention is, however, not limited to the diesel engine but may be a gasoline engine or the like.

The internal combustion engine 1 is connected with an exhaust passage 2. An SCRF 4 is provided in the exhaust passage 2 and is configured by supporting a selective catalytic reduction NOx catalyst (hereinafter simply referred to as "SCR catalyst") that selectively reduces NOx in the exhaust gas using ammonia as a reducing agent in a wall-flow filter that traps particulate matter (PM) included in the exhaust gas. Urea water that is a precursor of ammonia is stored in a urea tank 8 and is supplied to the exhaust gas by means of a supply valve 7 placed on the upstream side of the SCRF 4, in order to produce ammonia that serves as the reducing agent in the SCR catalyst supported in the SCRF 4. The urea water supplied by the supply valve 7 is hydrolyzed with the heat of the exhaust gas to produce ammonia. The ammonia reaches the SCRF 4 and is adsorbed to the SCR catalyst supported therein. NOx is reduced by a reduction reaction of ammonia with NOx in the exhaust gas. According to this embodiment, the urea water is supplied by the supply valve 7 as described above. According to a modification, ammonia or ammonia water may be supplied directly to the exhaust gas.

An oxidation catalyst (hereinafter referred to as "ASC catalyst") 5 is provided on the downstream side of the SCR 4 to oxidize ammonia slipping from the SCRF 4. The ASC catalyst 5 may be a combination catalyst configured by combining the oxidation catalyst with the SCR catalyst that reduces NOx in the exhaust gas using ammonia as the reducing agent. In this case, for example, the oxidation catalyst may be formed by supporting a noble metal such as platinum (Pt) in a carrier made of aluminum oxide ($Al_2O_3$), zeolite or the like as the material, and the SCR catalyst may be formed by supporting a base metal such as copper (Cu) or iron (Fe) in a carrier made of zeolite as the material. The ASC catalyst 5 of such configuration is capable of oxidizing HC, CO and ammonia included in the exhaust gas, while producing NOx by oxidation of part of the ammonia and causing the produced NOx to be reduced with an excess of the ammonia.

Additionally, an oxidation catalyst 3 having the oxidation function is provided on the upstream side of the SCRF 4 and the supply valve 7. A fuel supply valve 6 is placed on the upstream side of the oxidation catalyst 3 to supply a fuel (fuel component) of the internal combustion engine 1 to the oxidation catalyst 3 via the exhaust gas flowing into the oxidation catalyst 3. The fuel component supplied to the exhaust gas by the fuel supply valve 6 is oxidized by the oxidation catalyst 3, so as to increase the temperature of the exhaust gas flowing into the SCRF 4 placed on the downstream side.

Furthermore, a NOx sensor 10 of detecting the amount of NOx included in the exhaust gas flowing into the SCRF 4 is provided on the upstream side of the SCRF 4. A NOx sensor 11 of detecting the amount of NOx included in the exhaust gas flowing out of the SCRF 4 and a PM sensor 12 of detecting the amount of PM included in the exhaust gas are provided on the downstream side of the SCRF 4. The internal combustion engine 1 is provided with an electronic control unit (ECU) 20 that is a unit of controlling the operating conditions of the internal combustion engine 1, the exhaust control system and the like. The ECU 20 is electrically connected with, for example, a crank position sensor 21, an accelerator position sensor 22 and an air flowmeter placed in an intake system (not shown) of the internal combustion engine 1, in addition to the NOx sensors 10 and 11 and the PM sensor 12 described above. Detection values of the respective sensors are transferred to the ECU 20. Accordingly the ECU 20 is notified of parameters relating to the operating conditions of the internal combustion engine 1, for example, an amount of intake air based on the detection value of the air flowmeter, a flow rate of the exhaust gas computed from the amount of intake air, an engine rotation speed based on detection of the crank position sensor 21 and an engine load based on detection of the accelerator position sensor 22.

According to this embodiment, NOx included in the exhaust gas flowing into the SCRF 4 is detectable by the NOx sensor 10. The amount of NOx included in the exhaust gas discharged from the internal combustion engine 1 (the exhaust gas prior to reduction by the SCRF 4, i.e., the exhaust gas flowing into the SCRF 4) is related to the operating conditions of the internal combustion engine and may thus be estimated based on the operating conditions of the internal combustion engine 1.

The ECU 20 outputs an instruction to the supply valve 7 according to the detected amount or estimated amount of NOx (NOx concentration) in the exhaust gas described above, and supplies a required amount of urea water that is needed for reductive conversion of NOx, to the exhaust gas. For example, supply of urea water by the supply valve 7 may be controlled such that the NOx reduction rate by the SCRF 4 determined by Equation 1 given below is in a predetermined range that is preferable from the standpoint of exhaust control. Another procedure may determine the supply amount of urea water by the supply valve 7, based on the output of the NOx sensor 10 on the upstream side:

NOx reduction rate=1−(detection value of NOx sensor 11)/(detection value of NOx sensor 10)     (Equation 1)

The exhaust control system for the internal combustion engine 1 having the above configuration supplies urea water by the supply valve 7 according to the amount of NOx included in the exhaust gas as described above to reduce NOx by the SCRF 4, while trapping PM included in the exhaust gas by the filter function of the SCRF 4. In the course of reduction of NOx and trapping of PM by the SCRF 4, various abnormal states regarding the SCRF 4 may be caused by, for example, a heat load or an external factor applied to the SCRF 4. The exhaust control system of the invention accordingly performs abnormality determination control to determine an abnormal state regarding the SCRF 4 as described below. This control is described with reference to FIG. 2. The abnormality determination control shown in FIG. 2 is performed by executing a control program stored in the ECU 20. The following describes abnormal states to be determined by the abnormality determination control.

<Abnormal State to be Determined>

(1) Trapping Abnormal State of SCRF 4

The trapping abnormal state means a state that the PM trapping function of the SCRF 4 is failed and the exhaust gas without sufficiently trapping PM flows out to the downstream side of the SCRF 4. An example of the trapping abnormal state is a damage state in which the base material of the SCRF 4 has a crack (cracking) and the crack location causes insufficient trapping of PM. Another example in the case of oxidation removal of the trapped PM in the SCRF 4 is an erosion state in which the temperature of the SCRF 4 becomes excessively high by the heat of oxidation to melt the base material and the erosion location causes insufficient trapping of PM. Additionally, in the exhaust control system for the internal combustion engine 1, the state that the SCRF 4 itself is detached, i.e., the state without the SCRF 4 is incapable of actually trapping PM by the SCRF 4. This state may thus be included in the trapping abnormal state.

(2) Sensor Abnormal State of PM Sensor 12

The sensor abnormal state means a state that the function of detecting the amount of PM by the PM sensor 12 is failed and a higher amount of PM is detected than the actual amount of PM in the exhaust gas. In this sensor abnormal state, the detection result of the PM sensor 12 provides excessive estimation of the actual amount of PM in the exhaust gas.

(3) Deterioration State of SCR Catalyst Supported in SCRF 4 or Abnormal State Relating to Supply of Urea Water (Hereinafter Referred to as "Catalyst or Other Abnormal State")

The catalyst or other abnormal state means an abnormal state relating to reduction of NOx by the SCRF 4. An example of the catalyst or other abnormal state is a deterioration state in which the SCR catalyst supported in the SCRF 4 deteriorates and thereby provides an insufficient function of reducing NOx by the SCRF 4. Another example is an abnormal state relating to supply of urea water in which a lower concentration of urea water is supplied by the supply valve 7 than a predetermined concentration or a less amount of urea water is supplied by the supply valve 7 than an actually required supply amount and such supply provides an insufficient function of reducing NOx by the SCRF 4.

The following describes a flow of abnormality determination control to determine the abnormal states described above, with reference to FIG. 2. The abnormality determination control is performed when reduction of NOx is performed by the SCRF 4, i.e., when the temperature of the SCR catalyst supported in the SCRF 4 reaches a temperature range suitable for reduction of NOx, and preferably when urea water is supplied by the supply valve 7. At S101, the control flow computes the NOx reduction rate by the SCRF 4 according to Equation 1 given above, based on the detection values of the NOx sensor 10 and the NOx sensor 11. The NOx reduction rate is a parameter that indicates the capability of reducing and converting NOx in the exhaust gas by the NOx reduction function of the SCR catalyst supported in the SCRF 4. In place of the detection value of the NOx sensor 10, the estimated amount of NOx in the exhaust gas flowing into the SCRF 4 according to the operating conditions of the internal combustion engine 1 may be used for the computation of the NOx reduction rate as described above. On completion of the process at S101, the control flow proceeds to S102.

At S102, the control flow computes the PM trapping rate by the SCRF 4, based on the detection value of the PM sensor 12. The PM trapping rate is a parameter that indicates the capability of trapping PM in the exhaust gas by the filter function of the SCRF 4. In computation of the PM trapping rate, the amount of PM in the exhaust gas flowing into the SCRF 4 is related to the operating conditions of the internal combustion engine 1, so that the amount of PM in the exhaust gas flowing into the SCRF 4 may be estimated, based on the operating conditions (for example, the engine rotation speed and the engine load). The PM trapping rate is computed according to Equation 2 given below:

PM trapping rate=1−(detection value of PM sensor 12)/(estimated amount of PM in exhaust gas flowing into SCRF 4)     (Equation 2).

On completion of the process at S102, the control flow proceeds to S103.

At S103, the control flow determines whether the NOx reduction rate computed at S101 is equal to or lower than a predetermined NOx reduction rate N1. This predetermined NOx reduction rate N1 is a threshold used to determine whether reduction of NOx by the SCRF 4 is performed desirably. As described above, the abnormal state determined by the abnormality determination control includes (1)

the trapping abnormal state of the SCRF 4 and (3) the catalyst or other abnormal state. The SCRF 4 is configured by supporting the SCR catalyst in the filter. In the trapping abnormal state of the SCRF 4, the exhaust gas flows into the crack location, into the erosion location or, in some cases, into the space without installation of the SCRF, so that this exhaust gas is not subjected to the NOx reducing action of the SCR catalyst. This is likely to cause a failure to sufficiently reduce NOx and is thereby likely to decrease the NOx reduction rate. In the catalyst or other abnormal state, the filter has no problem unlike the trapping abnormal state, but an abnormality occurs in the SCR catalyst supported in the filter or in the supply of urea water. This is also likely to cause a failure to sufficiently reduce NOx and is thereby likely to decrease the NOx reduction rate. The control flow of this embodiment takes into account the degree of decrease in the NOx reduction rate in these abnormal states and sets the above threshold N1 to distinguish these abnormal states from the other abnormal states and the normal state. The control flow proceeds to S104 in response to an affirmative answer at S103, while proceeding to S107 in response to a negative answer at S103.

At S104, the control flow subsequently determines whether the PM trapping rate computed at S102 is equal to or lower than a predetermined PM trapping rate P1. This predetermined PM trapping rate P1 is a threshold used to determine whether trapping of PM by the SCRF 4 is performed desirably. As described above, the abnormal state determined by the abnormality determination control includes (1) the trapping abnormal state of the SCRF 4 and (2) the sensor abnormal state. In the trapping abnormal state of the SCRF 4, the exhaust gas flows into the crack location, into the erosion location or, in some cases, into the space without installation of the SCRF, so that this exhaust gas is not subjected to trapping of PM by the filter. This is likely to a cause a failure to sufficiently trap PM and is thereby likely to decrease the PM trapping rate. In the sensor abnormal state, the filter has no problem unlike the trapping abnormal state, but a problem arises in the detection function of the PM sensor 12. This is likely to cause detection of an excessively large amount of PM compared with the actual amount of PM and is thereby likely to decrease the PM trapping rate computed according to Equation 2 given above. The control flow of this embodiment takes into account the degree of decrease in the PM trapping rate in these abnormal states and sets the above threshold P1 to distinguish these abnormal states from the other abnormal states and the normal state. The control flow proceeds to S105 in response to an affirmative answer at S104, while proceeding to S106 in response to a negative answer at S104.

At S107 after a negative answer at S103, the control flow determines whether the PM trapping rate computed at S102 is equal to or lower than the predetermined PM trapping rate P1, like S104. The control flow proceeds to S108 in response to an affirmative answer at S107, while proceeding to S109 in response to a negative answer at S107.

The details of the respective processes at S105, S106, S108 and S109 are described with reference to FIG. 3. FIG. 3 is a diagram illustrating four control areas R1 to R4 defined by the NOx reduction rate of the SCRF 4 computed at S101 and the PM trapping rate of the SCRF 4 computed at S102, in relation to the abnormal states and the normal state determined by the abnormality determination control. Areas having the PM trapping rate equal to or lower than the predetermined PM trapping rate P1 in FIG. 3 correspond to the predetermined low trapping rate area of the invention.

Areas having the NOx reduction rate equal to or lower than the predetermined NOx reduction rate N1 in FIG. 3 correspond to the predetermined low reduction rate area of the invention. Areas having the NOx reduction rate higher than the predetermined NOx reduction rate N1 in FIG. 3 correspond to the predetermined high reduction rate area of the invention.

When the NOx reduction rate and the PM trapping rate are included in the area R1, i.e., when the flow of abnormality determination control proceeds to S105, the occurrence of (1) the trapping abnormal state described above is determined. This suggests that the trapping abnormal state in the exhaust control system for the internal combustion engine 1 is likely to cause both a failure to desirably trap PM by the SCRF 4 and a failure to desirably reduce NOx by the SCRF 4. When the NOx reduction rate and the PM trapping rate are included in the area R2, i.e., when the flow of abnormality determination control proceeds to S108, the occurrence of (2) the sensor abnormal state described above is determined. This suggests that the sensor abnormal state in the exhaust control system for the internal combustion engine 1 is likely to cause a failure to appropriately compute the PM trapping rate due to an abnormality of the sensor, while maintaining desirable reduction of NOx by the SCRF 4. As described above, in the abnormality determination control, when the NOx reduction rate and the PM trapping rate are included in the predetermined low trapping rate area, it is further determined whether the NOx reduction rate and the PM trapping rate are included in the predetermined low reduction rate area or included in the predetermined high reduction rate area, on the basis of the NOx reduction rate. This results in determining and distinguishing the trapping abnormal state from the sensor abnormal state.

When the NOx reduction rate and the PM trapping rate are included in the area R3, i.e., when the flow of abnormality determination control proceeds to S106, the occurrence of (3) the catalyst or other abnormal state described above is determined. This suggests that the catalyst or other abnormal state in the exhaust control system for the internal combustion engine 1 is likely to cause a failure to desirably exert the NOx reduction function, while maintaining desirable trapping function of the SCRF 4. Additionally, when the NOx reduction rate and the PM trapping rate are included in the area R4, i.e., when the flow of abnormality determination control proceeds to S109, the normal state is determined. This suggests that no abnormal state is found in at least the trapping function and the NOx reduction function of the SCRF 4 and no abnormal state is found in the PM sensor 12.

On completion of the process at S105, S106, S108 or S109, the abnormality determination control is terminated. This control can clearly determine and distinguish the trapping abnormal state from the sensor abnormal state in the case where the NOx reduction rate and the PM trapping rate suggest a failure to desirably trap PM by the SCRF 4. Additionally, this control can also determine and distinguish the catalyst or other abnormal state with regard to the SCR catalyst supported in the SCRF 4 or the like. As a result, this allows for accurate determination of the abnormal state with regard to the SCRF 4. According to the embodiment, in the case of determination of one of these abnormal states, an indicator may be lit to inform the user of the internal combustion engine 1 of the occurrence of the abnormal state. The indicator may be provided for each type of abnormal state. According to another configuration, only one indicator may be provided and lit in the occurrence of any of the abnormal states, and the user may access the processing result of the ECU 20 or the like to check the details of the abnormal state.

<Modification 1>

According to the embodiment described above, the threshold N1 of the NOx reduction rate and the threshold P1 of the PM trapping rate are used for division of the respective control areas defined by the NOx reduction rate and the PM trapping rate. According to this modification, as shown in FIG. 4, N1' is a threshold of the NOx reduction rate to distinguish the area R1 related to the trapping abnormal state from the area R2 related to the sensor abnormal state. N2' that is different from N1' is a threshold of the NOx reduction rate to distinguish the area R3 related to the catalyst or other abnormal state from the area R4 related to the normal state. Setting these two different thresholds N1' and N2' is more likely to appropriately distinguish between the trapping abnormal state and the sensor abnormal state or distinguish between the catalyst or other abnormal state and the normal state by distinguishing the degree of decrease in the NOx reduction rate caused by the presence of the crack location or the like in the trapping abnormal state from the degree of decrease in the NOx reduction rate caused by deterioration of the SCR catalyst in the catalyst or other abnormal state.

Similarly, another threshold may be set in addition to the threshold P1 with regard to the threshold of the PM trapping rate. In correlation between the areas R1 and R2 in this case, the area R1 is set as the low reduction rate area and the area R2 is set as the high reduction rate area.

<Modification 2>

According to the embodiment described above, the detection value of the PM sensor 12 placed on the downstream side of the SCRF 4 is used to compute the PM trapping rate of the SCRF 4. According to a modification, as shown in FIG. 5, the detection value of a differential pressure sensor 13 configured to detect a differential pressure between the exhaust pressure on the upstream side of the SCRF 4 and the exhaust pressure on the downstream side may be used to compute the PM trapping rate of the SCRF 4. FIG. 5 is a diagram illustrating the schematic configuration of another exhaust control system for the internal combustion engine according to this modification. The components of this exhaust control system substantially similar to those of the exhaust control system shown in FIG. 1 are expressed by the same reference numbers and are not described in detail. In this modification, the PM trapping rate of the SCRF 4 may be computed according to a correlation between the estimated value of the amount of PM discharged from the internal combustion engine 1 and the estimated value of the amount of PM accumulated on the SCRF 4 based on the detection value of the differential sensor. More specifically, the amount of PM discharged from the internal combustion engine 1 for a predetermined time period is estimated based on the operating conditions of the internal combustion engine (for example, the engine load and the engine rotation speed). The PM trapping rate may be computed by comparison of an increase in PM accumulated amount on the SCRF 4 estimated from an increase in detection value of the differential pressure sensor 13 for the same time period with the estimated discharged amount of PM. Estimation of the PM accumulated amount using the detection value of the differential pressure sensor 13 is the prior art and is thus not described in detail. Taking into account the exhaust flow rate and the exhaust temperature for the estimation allows for the more accurate estimation of the increase in PM accumulated amount. In this modification, the abnormal state determined by the abnormality determination control described above is the sensor abnormal state of the differential pressure sensor, instead of the sensor abnormal state of the PM sensor 12. This suggests that the detection function of the differential pressure by the differential pressure sensor is failed and a lower differential pressure than the actual differential pressure is detected.

<Modification 3>

In the embodiment and the modifications described above, the PM trapping rate is used as the parameter indicating the trapping capability of the SCRF 4, and the NOx reduction rate is used as the parameter indicating the NOx reduction capability of the SCRF 4. According to a modification, the PM concentration in the exhaust gas on the downstream side of the SCRF 4 may be used to show the trapping capability, and the NOx concentration in the exhaust gas on the downstream side of the SCRF 4 may be used to show the NOx reduction capability. In this modification, the PM concentration is detected by the PM sensor, and the higher PM concentration indicates the lower trapping capability. When the PM concentration exceeds a predetermined concentration, the SRF4 falls into a predetermined state of low trapping capability. The NOx concentration is detected by the NOx sensor, and the higher NOx concentration indicates the lower NOx reduction capability.

Embodiment 2

In the exhaust control system for the internal combustion engine 1 according to the invention, in the case where the abnormal state with regard to the SCRF 4 is determined by using the NOx reduction rate and the PM trapping rate as described in the above embodiment, it is preferable that these parameters accurately reflect the NOx reduction capability and the PM trapping capability of the SCRF 4. In the course of trapping and accumulating PM on the SCRF 4, however, the computed NOx reduction rate and the computed PM trapping rate are likely to differ from the real NOx reduction capability and the real PM trapping capability of the SCRF 4 according to the degree of accumulation of PM. This is attributed to that both the parameters, i.e., the NOx reduction rate and the PM trapping rate, are computed by using the detection values of the NOx sensors 10 and 11 and the PM sensor 12. Such a difference is likely to adversely affect the accuracy of the abnormality determination with regard to the SCRF 4. The following describes an abnormality determination control to allow for the more accurate determination of abnormality with regard to the SCRF 4, with reference to FIG. 6.

Among the respective processes included in the abnormality determination control shown in FIG. 6, the same processes as those included in the abnormality determination control shown in FIG. 2 are expressed by the same reference numbers and are not described in detail. According to this embodiment, on completion of the process at S102, the process of S201 is performed. At S201, the control flow computes the amount of PM trapped by and accumulated on the SCRF 4. More specifically, the control flow computes the amount of PM accumulated on the SCRF 4 by using, for example, the amount of PM in the exhaust gas discharged from the internal combustion engine 1, which is computed based on an operation record (for example, the amount of fuel injection and the engine rotation speed) of the internal combustion engine 1, and a record of the PM trapping rate computed at S102 for a time period since oxidation removal of PM trapped by the SCRF 4. The reason for computing the PM accumulated amount on the SCRF 4 is that the PM trapping capability and the NOx reduction capability of the SCRF 4 are likely to vary by the effect of the PM accumulated amount and affect the accuracy of determination of abnormality with regard to the SCRF 4. On completion of the process at S201, the control flow proceeds to S202.

At S202, the control flow corrects the threshold N1 used for the determination at S103 and the threshold P1 used for the determination at S104 and S107, based on the PM accumulated amount computed at S201. The threshold N1 is the threshold of the NOx reduction rate used to determine whether the NOx reduction capability of the SCRF 4 is relatively low as described above. Increasing the PM accumulated amount on the SCRF 4 causes the surface of the SCR catalyst supported in the SCRF 4 to be covered by PM and accelerates the reaction of the accumulated PM with $NO_2$ in the exhaust gas, so as to decrease the amount of $NO_2$ subjected to reduction of NOx. This provides an apparent decrease from the practical NOx reduction capability of the SCRF 4. In this state, the actual NOx reduction capability of the SCRF 4 is not appropriately reflected on the computed NOx reduction rate. This is likely to provide an undesirable effect on determination of abnormality in the abnormality determination control. The threshold N1 of the NOx reduction rate is accordingly corrected, in order to relieve the effect of the difference between the NOx reduction rate and the actual NOx reduction capability of the SCRF 4. More specifically, by taking into account the apparent decrease in the NOx reduction capability with an increase in the PM accumulated amount, the threshold N1 is corrected to decrease with an increase in the PM accumulated amount.

The threshold P1 is the threshold of the PM trapping rate used to determine whether the PM trapping capability of the SCRF 4 is relatively low as described above. In the case where only a small amount of PM is accumulated on the SCRF 4, the pores in the filter efficiently trap PM. This allows PM to be actually trapped by the filter. Increasing the PM accumulated amount, however, clogs the pores and makes PM more likely to be accumulated on the surface layer of the filter. The ratio of accumulation on the surface layer increases with an increase in PM accumulated amount. Trapping of PM on the surface layer provides an apparent increase of PM trapping and is far from the result of the real trapping function of the SCRF 4. In this state, the actual PM trapping capability of the SCRF 4 is not appropriately reflected on the computed PM trapping rate. This is likely to provide an undesirable effect on determination of abnormality in the abnormality determination control. The threshold P1 of the PM trapping rate is accordingly corrected, in order to relieve the effect of the difference between the PM trapping rate and the actual PM trapping capability of the SCRF 4. More specifically, by taking into account the apparent increase in the PM trapping capability with an increase in the PM accumulated amount, the threshold P1 is corrected to increase with an increase in the PM accumulated amount.

On completion of the process at S202, the determination process is performed at S103 and S104 or S107 using the corrected thresholds N1 and P1. This relieves the effect of the difference between the computed PM trapping rate and NOx reduction rate and the actual PM trapping capability and NOx reduction capability of the SCRF 4 on the accuracy of determination in the abnormality determination control.

<Modification>

The following describes a modification of the embodiment to relieve the effect of the difference described above on the accuracy of determination in the abnormality determination control, with reference to FIGS. 7 to 9. Among the respective processes included in abnormality determination control shown in FIG. 7, the same processes as those included in the abnormality determination control shown in FIG. 2 or FIG. 6 are expressed by the same reference numbers and are not described in detail. In this embodiment, the process of S203 is performed in place of the process of S202 described above.

At S203, the control flow corrects the NOx reduction rate computed at S101 and the PM trapping rate computed at S102, based on the PM accumulated amount computed at S201. The correction of the NOx reduction rate is described first with reference to FIG. 8. As described above, increasing the PM accumulated amount on the SCRF 4 provides an apparent decrease from the practical NOx reduction capability of the SCRF 4. By taking into account the effect of the accumulated PM on the NOx reduction rate described above, a correction factor C1 for correcting the NOx reduction rate computed at S101 is determined at S203. More specifically, the correction factor C1 is determined according to a correlation between the PM accumulated amount and the correction factor C1 shown in FIG. 8. As described above, the real NOx reduction capability of the SCRF 4 has an apparent decrease with an increase in the PM accumulated amount. In order to compute the NOx reduction rate corresponding to the real NOx reduction capability, an example sets the correlation between the PM accumulated amount and the correction factor C1 to increase the correction factor C1 logarithmically with an increase in the PM accumulated amount. The product of the NOx reduction rate computed at S101 and the correction factor C1 is given as corrected NOx reduction rate.

The correction of the PM trapping rate is subsequently described with reference to FIG. 9. As described above, increasing the PM accumulated amount provides an apparent increase from the practical PM trapping capability of the SCRF 4. By taking into account the effect of the accumulated PM on the PM trapping rate described above, a correction factor C2 for correcting the PM trapping rate computed at S102 is determined at S203. More specifically, the correction factor C2 is determined according to a correlation between the PM accumulated amount and the correction factor C2 shown in FIG. 9. As described above, the real PM trapping capability of the SCRF 4 has an apparent increase with an increase in the PM accumulated amount. In order to compute the PM trapping rate corresponding to the real PM trapping capability, an example sets the correlation between the PM accumulated amount and the correction factor C2 to decrease the correction factor C2 with an increase in the PM accumulated amount. The product of the PM trapping rate computed at S102 and the correction factor C2 is given as corrected PM trapping rate.

On completion of the process at S202, the process of and after S103 is performed like the abnormality determination control shown in FIG. 2. This relieves the effect of the difference between the computed PM trapping rate and NOx reduction rate and the actual PM trapping capability and NOx reduction capability of the SCRF 4 on the accuracy of determination in the abnormality determination control.

REFERENCE SIGNS LIST

1 internal combustion engine
2 exhaust passage
3 oxidation catalyst
4 selective catalytic reduction NOx catalyst (SCR catalyst)
5 ASC catalyst
6 fuel supply valve
7 supply valve 10, 11 NOx sensor
12 PM sensor
13 differential pressure sensor
20 ECU
21 crank position sensor
22 accelerator position sensor

The invention claimed is:

1. An exhaust control system for an internal combustion engine, comprising:
   a NOx reduction filter that is provided in an exhaust passage of the internal combustion engine to trap a particulate matter included in an exhaust gas and is configured by supporting a selective catalytic reduction NOx catalyst that selectively reduces NOx in the exhaust gas using ammonia as a reducing agent;
   a reducing agent supplier that supplies ammonia or a precursor of ammonia to the NOx reduction filter via the exhaust gas flowing into the NOx reduction filter; and
   a controller, comprising at least one processor, configured to:
   obtain information regarding a trapping capability of the NOx reduction filter to trap the particulate matter in the exhaust gas, based on a detection value of an exhaust sensor provided to detect a predetermined parameter relating to the exhaust gas flowing out of the NOx reduction filter;
   obtain information regarding a NOx reduction capability of the NOx reduction filter, based on an amount of NOx in the exhaust gas flowing out of the NOx reduction filter; and
   determine and distinguish between a trapping abnormal state in which a trapping function of the particulate matter by the NOx reduction filter is failed and a sensor abnormal state in which a detection function of the predetermined parameter by the exhaust sensor is failed, based on the obtained information regarding the NOx reduction capability, when the obtained information regarding the trapping capability indicates that the trapping capability is in a predetermined low trapping capability state.

2. The exhaust control system for the internal combustion engine according to claim 1,
   wherein the controller is configured to:
   obtain a trapping rate of the particulate matter in the exhaust gas by the NOx reduction filter as the information regarding the trapping capability, based on the detection value of the exhaust sensor,
   obtain a NOx reduction rate by the NOx reduction filter as the information regarding the NOx reduction capability, based on the amount of NOx in the exhaust gas flowing out of the NOx reduction filter, and
   determine and distinguish between the trapping abnormal state and the sensor abnormal state, based on the NOx reduction rate, when the trapping rate is in a predetermined low trapping rate area that corresponds to the predetermined low trapping capability state.

3. The exhaust control system for the internal combustion engine according to claim 2,
   wherein at least a predetermined low reduction rate area and a predetermined high reduction rate area having a relatively higher NOx reduction rate than the predetermined low reduction rate area are set in the controller as areas relating to the NOx reduction rate, and
   the controller is configured to determine that the NOx reduction filter is in the trapping abnormal state when the trapping rate is in the predetermined low trapping rate area and the NOx reduction rate is in the predetermined low reduction rate area, and determine that the exhaust sensor is in the sensor abnormal state when the trapping rate is in the predetermined low trapping rate area and the NOx reduction rate is in the predetermined high reduction rate area.

4. The exhaust control system for the internal combustion engine according to claim 2,
   wherein the controller is configured to correct the trapping rate, based on an amount of the particulate matter trapped by the NOx reduction filter, and perform the determination based on the NOx reduction rate, when the corrected trapping rate is in the predetermined low trapping rate area.

5. The exhaust control system for the internal combustion engine according to claim 2,
   wherein the controller is configured to correct the NOx reduction rate, based on an amount of the particulate matter trapped by the NOx reduction filter, and perform the determination based on the corrected NOx reduction rate, when the trapping rate is in the predetermined low trapping rate area.

6. The exhaust control system for the internal combustion engine according to claim 2,
   wherein the controller is configured to correct an upper limit threshold of the trapping rate which defines the predetermined low trapping rate area, based on an amount of the particulate matter trapped by the NOx reduction filter, and perform the determination based on the NOx reduction rate, when the trapping rate is in a corrected low trapping rate area defined by the corrected upper limit threshold.

7. The exhaust control system for the internal combustion engine according to claim 3,
   wherein the controller is configured to correct a threshold of the NOx reduction rate which defines the predetermined low reduction rate area and the predetermined high reduction rate area, based on an amount of the particulate matter trapped by the NOx reduction rate filter, and determine that the exhaust sensor is in the sensor abnormal state, when the trapping rate is in the predetermined low trapping rate area and the NOx reduction rate is in a corrected high reduction rate area defined by the corrected threshold of the NOx reduction rate.

8. The exhaust control system for the internal combustion engine according to claim 1, wherein
   the trapping abnormal state includes at least one of a damage state caused by cracking of the NOx reduction filter, an erosion state of the NOx reduction filter and a state where the NOx reduction filter is not installed.

9. The exhaust control system for the internal combustion engine according to claim 1, wherein
   the exhaust sensor is either a PM sensor that detects an amount of the particulate matter in the exhaust gas flowing out of the NOx reduction filter or a differential pressure sensor that detects a difference between an exhaust pressure on an upstream side of the NOx reduction filter and an exhaust pressure on a downstream side of the NOx reduction filter.

10. The exhaust control system for the internal combustion engine according to claim 1,
    wherein the controller is configured to notify a user of a result of the determination on whether the trapping abnormal state or the sensor abnormal state is formed.

* * * * *